Figure 1:
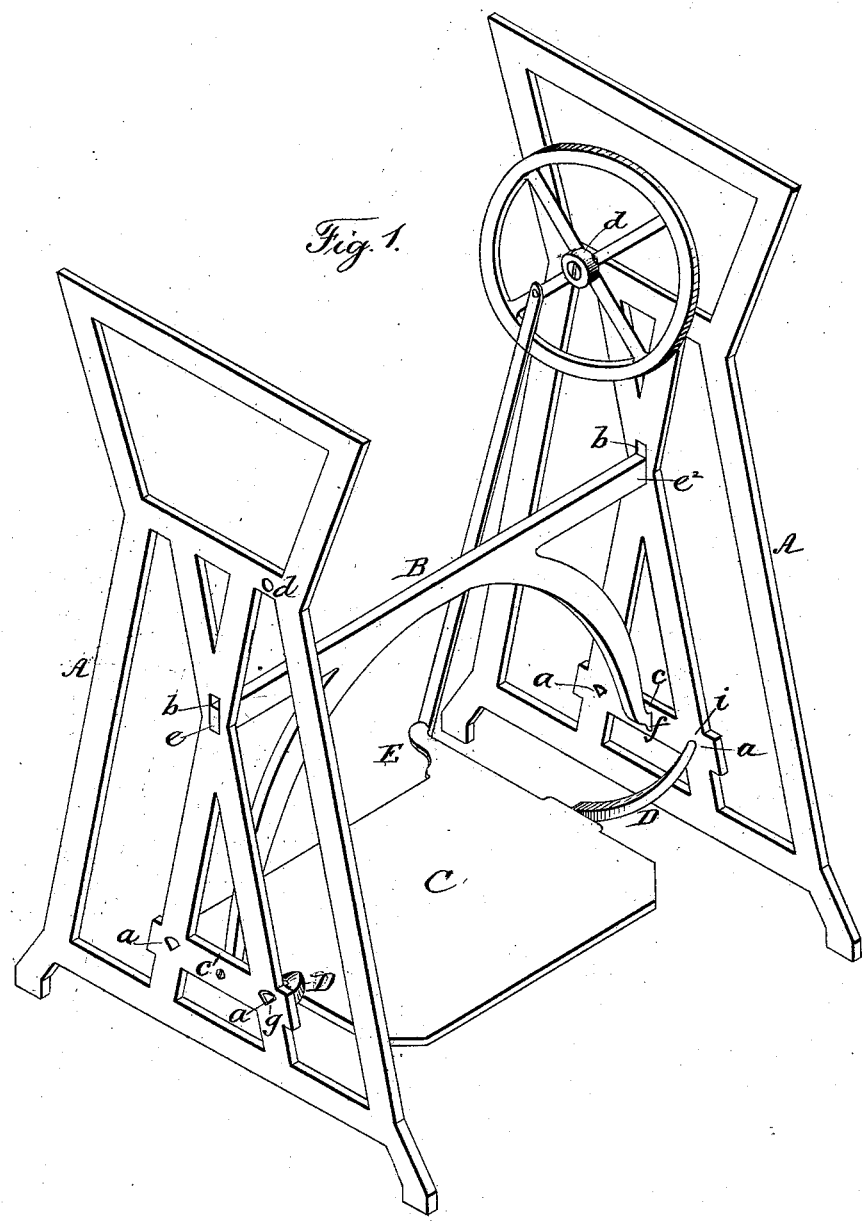

(No Model.)  2 Sheets—Sheet 1.

F. M. WEAVER.
TREADLE AND STAND FOR SEWING MACHINES.

No. 298,258. Patented May 6, 1884.

Witnesses
H. C. Nuntemann
W. F. Stearns

Inventor
Francis Marion Weaver
by Johnson and Johnson
his Attys.

(No Model.) 2 Sheets—Sheet 2.
F. M. WEAVER.
TREADLE AND STAND FOR SEWING MACHINES.
No. 298,258. Patented May 6, 1884.
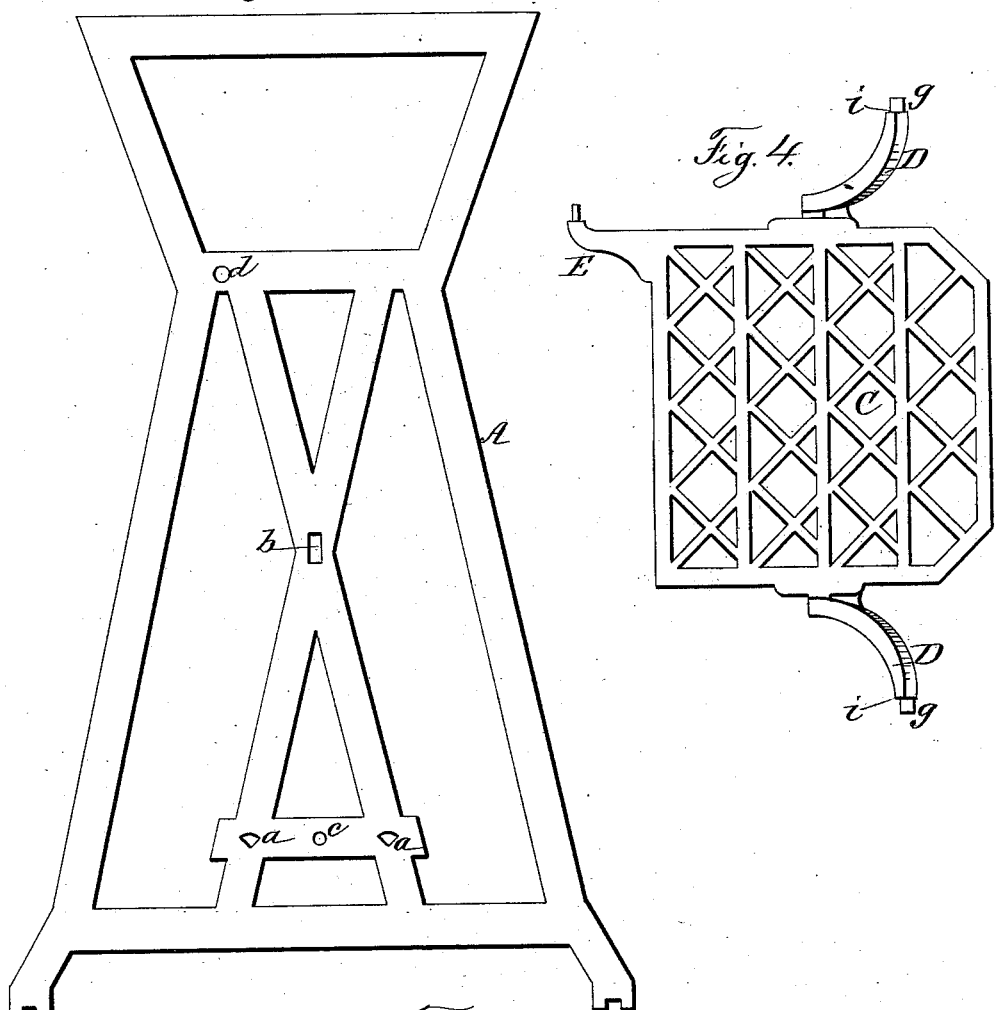
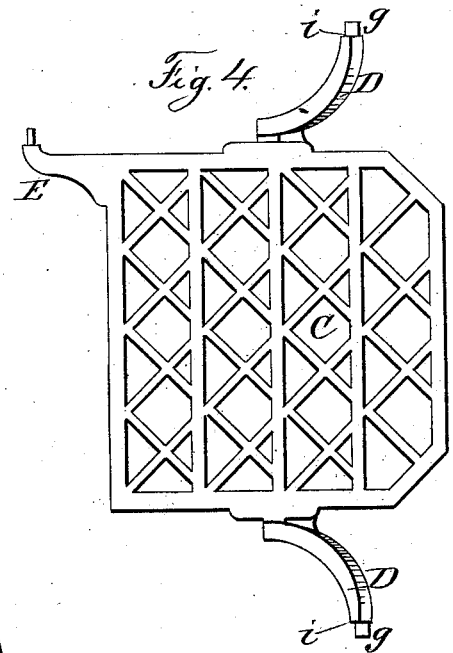
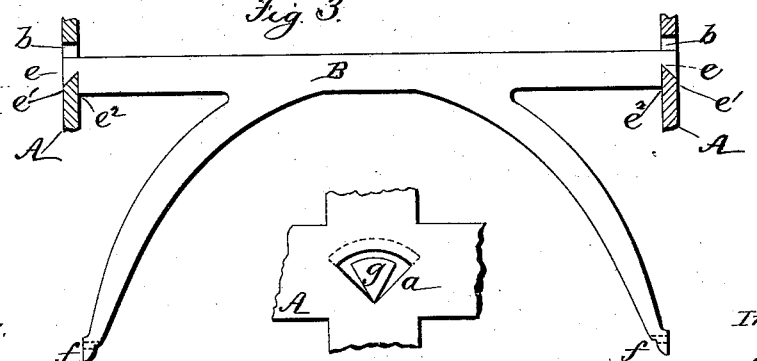
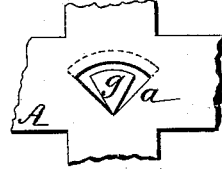
Witnesses. Inventor.

UNITED STATES PATENT OFFICE.

FRANCIS MARION WEAVER, OF SPRINGFIELD, OHIO, ASSIGNOR OF ONE-HALF TO WILLIAM AUGUSTUS HANCE, OF SAME PLACE.

TREADLE AND STAND FOR SEWING-MACHINES.

SPECIFICATION forming part of Letters Patent No. 298,258, dated May 6, 1884.

Application filed March 20, 1884. (No model.)

*To all whom it may concern:*

Be it known that I, FRANCIS MARION WEAVER, a citizen of the United States, residing at Springfield, in the county of Clark and State of Ohio, have invented new and useful Improvements in Treadles and Stands for Sewing-Machines, of which the following is a specification.

My invention relates to improvements on the sewing-machine treadle, in which the treadle is adapted to have a swinging vertical and horizontal motion upon supporting-arms having bearings in the line with the ankle-joints to relieve all strain upon the muscles of the limbs and of the back, and to operate the treadle by the movement of the foot alone.

The objects of my improvements are to dispense with the usual treadle-rod; to produce a treadle and stand adapted to be put together without regard to right or left hand stand-frames, to suit the balance-wheel; to adapt the stand, the bearings for the treadle, and the bearings for the balance-wheel to be fitted and firmly bound together and allow these frames to be changed to give new bearings to the moving parts to compensate for wear, and to simplify and cheapen the construction of the treadle and stand. The treadle, its supporting-arms, and pitman-connection are cast in one piece. The stand-frames are firmly and securely bound together by a cross-brace formed with hook ends and foot-bolt connections, and the treadle-arms are formed with knife-edge bearings fitting directly into the stand-frames.

A primary feature of my invention consists in the combination of a treadle with the stand-frames, having bearings in which the bearing-arms of the treadle are directly mounted, thus dispensing with the treadle-rod and making the treadle a part of the stand.

Referring to the accompanying drawings, Figure 1 represents a view in perspective of a sewing-machine treadle and stand embracing my invention. Fig. 2 shows one of the stand-frames; Fig. 3, the hooked cross-brace; Fig. 4, a top view of the treadle, and Fig. 5 the knife-edge bearing of the treadle.

The stand-frames A A are constructed, in any suitable manner, each with V-shaped openings $a\,a$ in a lower part, to receive the treadle-bearings, openings $b\,c$, to receive the fastenings of the cross-brace, and an opening, $d$, to receive the bearing of the balance-wheel. They are firmly secured and bound together by a cross-brace, B, having hook ends $e\,e$, adapted to hook into openings $b\,b$ in the frames, and perforated ends $f\,f$, the perforations whereof match with openings $c\,c$ in the stand-frames to receive fastening screw-bolts. The brace-hooks fit over inclines $e'\,e'$ of the openings $b$, and draw the frames together against shoulders $e^2\,e^2$ of the brace formed back of the hooks, and for this purpose the openings $b\,b$ are made to receive the hook ends of the brace and allow the hooks to pass over and drop down with a wedge action upon the inclines $e'$ in drawing the frames together, and to bring the perforated ends $f$ in position to receive the fastening screw-bolts $c'$ to complete the fastenings.

The treadle C is cast with the bearing-arms D D and the pitman-rod connection E, the position of said arms being such as to bring their bearing ends forward of a vertical line drawn through the middle of the frame and a horizontal line with the ankle of the foot when the heel is placed against the heel-stop. These arms are of cranked or curved form, and stand forward, so as to swing with the treadle in an easy ankle movement, and to maintain the treadle in a horizontal position, or nearly so, when at rest. They are formed with end knife-edge bearings, $g\,g$, adapted to fit into the V-shaped openings $a\,a$ of the stand-frames, so as to bring the shouldered ends $i\,i$ of the arms D against the inner sides of the frames, to prevent lateral movement of the treadle. Each frame has an opening, $d$, within which is secured the bearing for the balance-wheel, which may be the usual short stud having a conical bearing end and secured to the frame by a screw-nut. By having each frame formed with the two openings, $a\,a$, and with a top opening, $d$, the stand can be put together without having to select a particular side or frame for the balance-wheel, and the frames can be changed one with the other, and thus give new bearings for the treadle-arms, to compensate for wear. The upper holes, $d$, are one at one side of each frame, so that they will not be opposite when the stand is put together. The openings *a b c d* in the stand-frames can be cored in casting with a "chill," so as to case-harden them, giving a durable bearing, and greatly reducing the friction by the knife-edges of the treadle-bearings. The bearing-arms are preferably arranged to project from the middle of the treadle, as shown; but they may be arranged otherwise, only so as to bring their axis of motion in line with the ankle-joint, or nearly so. Any suitable connection may be made with the pitman-rod by means of the projection E, or by a horizontal arm projecting from the upper portion of the right-hand bearing-arm. The treadle is mounted directly in the stand-frames, and, in fact, forms a part of the stand, and by such construction can be placed nearer the floor, taking the place of the treadle-supporting rod. Whatever wear there may be in its bearings is downward upon an edge, and cannot, therefore, rattle or have any lost motion. It sits on knife-edge bearings directly in the stand-frame, and is fitted in place without fastenings.

It will be understood that the bearing-openings *a a* in each stand-frame A A are on the same horizontal plane, and are in coincident line with each other, and that the upper openings, *d d*, are on the same horizontal plane, but not opposite each other.

I claim—

1. The combination, with the stand-frames having bearing-openings *a a*, and a suitable brace for said frame, of the treadle having bearing-arms adapted to fit and work directly in the stand-bearing openings, substantially as described.

2. The combination, with the stand-frames having bearing-openings *a a*, and openings *b b*, the latter having inclines *e'*, and a treadle having bearing-arms adapted to fit and work directly in the stand-bearing openings, of a cross-brace having hook-shouldered ends $e\ e^2$, adapted to fit the inclines of said openings *b b*, and perforated ends *f f*, bolted to the said stand-frames, substantially as described.

3. The stand-frames A A, having the V-shaped bearing-openings *a a*, the openings *b b*, having inclines *e'*, and the openings *c d*, arranged substantially as shown and described, combined with a treadle having bearing-arms terminating in shouldered knife-edge bearings *g i*, and a cross-brace, B, having shouldered hook ends $e\ e^2$ and perforated ends *f f*, all constructed substantially as set forth.

4. The treadle having the bearing-arms D D, and the pitman-rod connection E, formed integrally, in combination with stand-frames having bearing openings adapted to receive the bearing ends of said arms, and means, as described, for securing and bracing said stand-frame to confine the treadle in its bearings, substantially as herein set forth.

5. The combination of a treadle having bearing-arms, arranged as described, with the stand-frames A A, each having two bearing-openings, *a a*, arranged on the same horizontal plane and in coincident lines with each other, and an opening, *d*, at one side, not opposite but on the same horizontal plane, and a suitable cross-brace, substantially as herein set forth, for the purpose specified.

In testimony whereof I have hereunto set my hand in the presence of two subscribing witnesses.

FRANCIS MARION WEAVER.

Witnesses:
JAS. JOHNSON, Jr.,
J. GEORGE S. DIAL.